3,338,779
METHOD FOR CONTROLLING AQUATIC LIVING ORGANISMS WITH MIXED HEXAHALODIMETHYL SULFONES
Robert J. Herschler and Wilbur L. Shilling, Camas, Wash., assignors to Crown Zellerbach Corporation, San Francisco, Calif., a corporation of Nevada
No Drawing. Filed July 2, 1963, Ser. No. 292,484
5 Claims. (Cl. 167—22)

The present invention relates to new and novel chemical compounds, a method of preparation thereof and a method of controlling certain living organisms therewith.

It is one object of this invention to provide a group of new and novel chemical compounds, namely, mixed hexahalodimethyl sulfones.

Another object is to provide a method for preparing said group of compounds.

Still a further object is to provide a method of controlling certain living organisms with said chemicals.

Other objects and advantages of this invention will appear in the following description and appended claims.

The new chemical compounds are represented by the following formula:

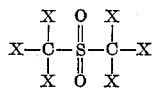

wherein each X is a halogen and may be either chlorine or bromine so that the formula contains at least one chlorine and one bromine.

The term "mixed hexahalodimethyl sulfone" indicates that the compound contains both chlorine and bromine as represented in the formula by X. Exemplary of these compounds are monobromopentachlorodimethyl sulfone, dibromotetrachlorodimethyl sulfone, tribromotrichlorodimethyl sulfone, tetrabromodichlorodimethyl sulfone, and pentabromomonochlorodimethyl sulfone.

The products are prepared, in accordance with the present invention, by reacting, in an aqueous alkaline medium, a hypohalite, i.e. an alkali metal or an alkaline earth metal hypochlorite or hypobromite or a mixture thereof with at least one substance selected from the group consisting of dimethyl sulfide, dimethyl sulfoxide, dimethyl sulfone, and partially halogenated dimethyl sulfones wherein the halogens are chlorine, bromine or both. It is preferred to use from about 1 to about 8 moles of the hypohalite per mole of the substance mentioned hereinabove. The hypohalite and the amount thereof must be so selected that a desired number of chlorine and bromine atoms in the product of the reaction is obtained. For example, if the desired sulfone is monobromopentachlorodimethyl sulfone and the starting reactant is dimethyl sulfone, then the aqueous medium, which may be water, must contain at least 5 moles of the hypochlorite and one mole of hypobromite per mole of dimethyl sulfone.

The reaction may be carried out without the presence of any excess of hydroxide ion. However, it is preferred to have an excess of hydroxide ion present with the reactants. The best results are obtained when the excess hydroxide ion is between about 2 and about 8 moles per liter of the hypohalite solution. The reaction takes place at a temperature range of from about 25° C. to about 100° C., preferably from about 40° C. to about 80° C. The reaction is exothermic, requires some cooling, and it may be carried out batchwise or continuously.

The resulting product is separated from the reaction mixture easily by filtration, extraction, centrifugation, decantation, and the like conventional methods. When it is desired to purify the product, the simple expedient of washing with water usually suffices to remove impurities of any significance.

The compounds of the present invention are useful to control certain pests, i.e. aquatic plants, including algae and higher aquatic plants; invertebrate animals; and microorganisms.

The term "aquatic plants" as herein employed refers to vegetative organisms growing in water in which a major part of such organisms are normally largely submerged. Such submerged parts may be roots as in Lemna, or leaves as in Vallisneria, or entire plants such as Anacharis. The term is inclusive of all water plants, such as Salvinia, which are normally free floating in their environing water as well as immersed species which are typically rooted in earth, such as Vallisneria and a species which appear to grow normally in all respects either free-floatng or rooted, such as Anacharis.

The term "higher aquatic plants" as herein employed refers to aquatic plants which are botanically higher than algae.

The term "control," in the sense in which it is used herein, is intended to set forth the action of killing, inhibiting growth, inhibiting reproduction and proliferation, removing, destroying and otherwise diminishing the occurrence and activity of the controlled living organisms, or the means employed for the achievement of such action, or the results of such actions. Thus the term "control" is held to be applicable to any of the stated actions, or any combination thereof. The term "control" is not intended in the sense of encouraging, invigorating, beneficiating, protecting, propagating, or increasing.

Pests, such as aquatic algae and higher aquatic plants, and invertebrate animals, are easily and economically controlled upon contact with an effective amount of any of the compounds of this invention, i.e. an amount which upon applications to such pests is sufficient to control them. A single compound of this invention or a mixture of the compounds may thus be employed.

Exemplary of the living organisms that can be controlled by the compounds of this invention are aquatic plants, such as algae and higher aquatic plants; invertebrate animals including insects, mites, nematodes, symphylids, fish, lampreys, mollusks, such as fresh water snails and marine teredos, marine crustaceans, such as barnacles; and microorganisms, such as bacterial and fungi. The microorganisms may be those that attack agricultural plants, such as the fungi. These pests are referred to herein as agricultural microorganisms, such as agricultural fungi or bacteria. However, the microorganisms may also attack non-agricultural substrates, such as foods, leather, paper, adhesives and paints. Thus, these pests are herein referred to as non-agricultural microorganisms, such as non-agricultural fungi or bacteria.

As to the aquatic pests, the chemicals of this invention in unmodified form may be introduced into the water or they may be introduced in the form of compositions whereby their distribution, dispersion, and contacting of the living organisms are facilitated. As to non-aquatic pests, i.e. the invertebrates, a compound of this invention may be admixed with oil, or employed as a constituent of oil-in-water or water-in-oil emulsion, or as an aqueous dispersion thereof which may be applied as a spray, drench, wash, or admixed with powders and applied as dusts.

The compounds of the present invention are typically from colorless to pale yellow and are crystalline, solid, dispersible in water, and soluble in many common organic solvents such as acetone, lower alkyl ethers, and lower alkanols. The compounds have low solubility in water. However, they are readily and conveniently adapted to be distributed in water to control the pests.

The concentration of the compounds of this invention in an aquatic medium may vary over a wide range depending on the nature of the living organism and the type of control desired. Thus a composition with a concentration of the compounds as low as about 0.1 part per million of the aquatic medium, such as water may be sufficient in most of the cases.

The following examples illustrate, but in no way limit, the application of this invention.

EXAMPLE 1

A suspension of 9.4 g. of unsymmetrical tetrachlorodimethyl sulfone in water was slowly treated with 12 g. of sodium hypobromite and 4 g. of sodium hydroxide in 150 ml. of water, keeping the temperature at 45° C. After about an hour, the reaction mixture was extracted with chloroform. Evaporation of the extract produced 2.4 g. of dibromotetrachlorodimethyl sulfone with a M.P. (melting point) of 52° C.

EXAMPLE 2

A suspension of 17.3 g. of monobromodimethyl sulfone in 200 ml. of water was stirred and slowly treated with 75 g. of sodium hypochlorite in 500 ml. of water, keeping the temperature at 50°–60° C. After cooling, the mixture was extracted with chloroform. Evaporation of the extract produced 23.8 g. of monobromopentachlorodimethyl sulfone in the form of white crystals melting at 44.7° C.

EXAMPLE 3

A solution containing 64 g. of sodium hypobromite and 160 g. of sodium hydroxide in 715 ml. of water was prepared along with a solution containing an equivalent amount (40 g.) of sodium hypochlorite and 160 g. of sodium hydroxide in 715 ml. of water. These were simultaneously metered into a solution of 17 g. of dimethyl sulfoxide in 200 ml. of water, while stirring vigorously and maintaining the temperature at about 40° C. Extraction of the cooled reaction mixture with chloroform and evaporation of the extract produced 75 g. of almost odorless white crystals of tribromotrichlorodimethyl sulfone with a M.P. of 121° C.

EXAMPLE 4

Control of algae

Monobromopentachlorodimethyl sulfone was used to treat waters containing nearly pure cultures of several algae. The algae used were a chlorella type, a black algae, a filamentous green type and a red algae. The compound produced 100% kill at the concentration of 5 p.p.m. of all but the red algae. The red algae were killed at 50 p.p.m. concentration.

EXAMPLE 5

Control of insects

Heavily aphid infested bush bean plants were sprayed to the leaf drip stage with a 0.01% by weight solution of monobromopentachlorodimethyl sulfone. The aphids were dead 24 hours after the treatment. Dibromotetrachlorodimethyl sulfone and tribromotrichlorodimethyl sulfone were also applied by the same method and produced substantially the same results.

EXAMPLE 6

Control of mites

Heavily mite infested peach trees were sprayed to the leaf drip stage with a 0.01% solution of monobromopentachlorodimethyl sulfone. Examination of the treated areas showed that the mites were dead 24 hours after the spraying. The same method was employed and similar results were obtained with dibromotetrachlorodimethyl sulfone, tribromotrichlorodimethyl sulfone and monochloropentabromodimethyl sulfone.

EXAMPLE 7

Control of fungi

An agar plate of 50% by weight of nutrient and 50% by weight of Sabouraud's dextrose was treated with monobromopentachlorodimethyl sulfone in the amount of 0.05% by weight of agar. The plate was innoculated with spores of *Aspergillus niger*, *Penicillium digitatum* and *Botrytis cinerea* and was incubated in the dark at 20° C. for 7 days, after which period of time, the examination of the plate indicated 100% kill. There was no vegetation growth. A control plate, without the test fungicide, was covered with heavy fungal growth. Similar results were obtained with dibromotetrachlorodimethyl sulfone, tribromotrichlorodimethyl sulfone, and monochloropentabromodimethyl sulfone.

EXAMPLE 8

Control of paper mill slime

Units of a water slurry containing 0.25% by weight of groundwood fibers, naturally infested with a high microorganism count, principally *Aerobacter aerogenes* were treated with 100 p.p.m. of monobromopentachlorodimethyl sulfone. The pulp slurry had a count in excess of 100,000 organisms per ml. Within two hours, all of the organisms were dead. Similar results were obtained with dibromotetrachlorodimethyl sulfone and tribromotrichlorodimethyl sulfone.

EXAMPLE 9

Control of yeast

*Saccharomyces cerevisiae* were cultured in malt extract broth. Monobromopentachlorodimethyl sulfone was added to the broth in a quantity calculated to produce a concentration of 50 p.p.m. of the broth. The chemical produced a 100% kill of yeast cells within 24 hours. Similar results were obtained with dibromotetrachlorodimethyl sulfone, tribromotrichlorodimethyl sulfone and monochloropentabromodimethyl sulfone.

EXAMPLE 10

Control of bacteria

Monobromopentachlorodimethyl sulfone was added to a broth culture at the concentration level of 50 p.p.m. The broth culture was of two test organisms *Micrococcus pyogenes*, var. *aureus* and *Escherichia coli*. Plates of the broth containing nutrient agar were incubated at 37° C. for 48 hours after which time all the organisms were dead. Similar results were obtained with dibromotetrachlorodimethyl sulfone and tribromotrichlorodimethyl sulfone.

EXAMPLE 11

Control of symphilids

Symphilids were placed in a filter paper saturated with water dispersion of monobromopentachlorodimethyl sulfone at a concentration of 75 p.p.m. Symphilids were rapidly deactivated. After 24 hours all symphilids were dead. Similar results were obtained with dibromotetrachlorodimethyl sulfone and tribromotrichlorodimethyl sulfone.

EXAMPLE 12

Control of nematodes

Soil samples infected with the root knot nematode were treated with a water dispersion of 400 p.p.m. of monobromopentachlorodimethyl sulfone. The treated soil was stored in porous crocks for one week, allowed to lie fallow as a 1-inch deep layer for one week, and then planted with 6-week old tomato plants. Tomato plants were lifted after four weeks exposure to the soil and found to be free of nematode infection. Control plantings in untreated soil were heavily infected. Similar results were obtained with dibromotetrachlorodimethyl sulfone and tribromotrichlorodimethyl sulfone.

EXAMPLE 13

Control of mollusks

Fresh water snails in aquariums were exposed to a 10 p.p.m. concentration of monobromopentachlorodimethyl sulfone. Within a few minutes all the snails had floated to the surface. After one hour, they were transferred to clean water but none recovered; they were all dead. Similar results were obtained with dibromotetrachlorodimethyl sulfone, and tribromotrichlorodimethyl sulfone.

EXAMPLE 14

*Control of crustaceans*

Fresh water cray fish of 1 to 2 inch body lengths were exposed to a 25 p.p.m. concentration of monobromopentachlorodimethyl sulfone in an aquarium. All were violently agitated by the chemical addition and within one hour appeared to be dead. None of them revived on transfer to fresh water; they were all dead. Similar results were obtained with dibromotetrachlorodimethyl sulfone.

Reasonable variations and modifications are possible within the scope of the foregoing disclosure and the appended claims.

Having thus described our invention in preferred embodiments, we claim:

1. A method of controlling aquatic living organisms from the group consisting of aquatic plants, mollusks and crustaceans comprising applying to at least one of said organisms an effective amount of at least one compound of the formula:

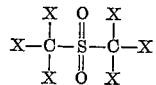

wherein each X is a halogen selected from the group consisting of chlorine and bromine and said formula contains at least one chlorine and one bromine as represented by X.

2. The method of claim 1 wherein said aquatic living organisms are aquatic plants.

3. The method of claim 2 wherein said aquatic plants are algae.

4. The method of claim 1 wherein said aquatic living organisms are mollusks.

5. The method of claim 1 wherein said aquatic living organisms are crustaceans.

References Cited

UNITED STATES PATENTS

| | | | |
|---|---|---|---|
| 2,127,400 | 8/1938 | Gibbs | 260—607 |
| 2,858,341 | 10/1958 | Dole | 167—22 X |
| 2,877,153 | 3/1959 | Webb et al. | 167—22 |
| 2,898,261 | 8/1959 | Youngson | 167—22 |
| 2,959,517 | 11/1960 | Bowers et al. | 167—22 |
| 3,051,757 | 8/1962 | Johnston | 167—22 X |
| 3,095,457 | 6/1963 | Chang | 260—607 |
| 3,118,952 | 1/1964 | Crowther et al. | 260—607 |
| 3,136,687 | 6/1964 | Hensley et al. | 167—22 |

ALBERT T. MEYERS, *Primary Examiner.*

JULIAN S. LEVITT, *Examiner.*

G. MENTIS, D. M. STEPHENS, *Assistant Examiners.*